United States Patent [19]
Abe

[11] Patent Number: 5,081,480
[45] Date of Patent: Jan. 14, 1992

[54] FINDER OF CAMERA HAVING MACRO-PHOTOGRAPHING FUNCTION

[75] Inventor: Tetsuya Abe, Tokyo, Japan

[73] Assignee: Asahi Kogaku Kogyo Kabushiki Kaisha, Tokyo, Japan

[21] Appl. No.: 655,302

[22] Filed: Feb. 14, 1991

[30] Foreign Application Priority Data

Feb. 14, 1990 [JP] Japan .................................. 2-33002

[51] Int. Cl.⁵ ............................................ G03B 13/10
[52] U.S. Cl. .................................... 354/222; 354/199; 354/195.12
[58] Field of Search ................ 354/221, 222, 223, 224, 354/225, 166, 167, 199, 200, 201, 219, 195.12

[56] References Cited

U.S. PATENT DOCUMENTS 2,737,844  7/1951  Jerome et al. ...................... 354/221
4,336,985  6/1982  Iwata et al. ......................... 354/221

Primary Examiner—W. B. Perkey
Assistant Examiner—Cassandra Spyrou
Attorney, Agent, or Firm—Sandler, Greenblum & Bernstein

[57] ABSTRACT

A finder device for a camera having a photographing optical system, a finder optical system independent therefrom, and having a macro-photographing mode. The finder includes at least one variable power lens which is provided in the finder optical system to vary the magnification thereof, and a field magnification varying device which moves the variable power lens in a direction to decrease the magnification upon transfer to the macro-photographing mode.

21 Claims, 5 Drawing Sheets

FINDER OF CAMERA HAVING MACRO-PHOTOGRAPHING FUNCTION

BACKGROUND OF THE INVENTION

1. Field of the Invention

The present invention relates to a finder of a camera having a macro-photographing function.

2. Description of Related Art

In a camera having a finder optical system and a photographing optical system that are separate from each other, a parallax inevitably occurs. Moreover, for a camera having a macro-photographing function this problem is even more likely to occur. To compensate for the parallax, such a camera is usually provided with a parallax correcting (compensating) mechanism which has a prism inserted in the optical axis of the finder to deflect the finder optical axis toward the optical axis of the photographing optical system upon macro-photography. Alternatively, such a camera is also often provided with a parallax correcting mechanism which moves the field frame (the frame defining the field of view) toward the photographing optical axis upon macrophotographing. However, in the former parallax correcting mechanism, since the optical axis is deviated by the prism, rays of light having the deviated optical axis are observed through the finder, thus resulting in a deteriorated image. In the latter parallax correcting mechanism, since the circumferential portion of the finder optical system is used, the quality of the image is also decreased. In addition, in known parallax correcting mechanisms, it is necessary to correct the diopter due to the transfer of the photographing mode into the macro mode.

SUMMARY OF THE INVENTION

The primary object of the present invention is to provide a finder device in which a photographing range can be known upon transfer into the macro mode, ensuring a high quality image.

Another object of the present invention is to provide a finder device in which the diopter correction can be effected upon transfer to the macro mode.

The inventors of the present invention have found that the field of view including the photographing range, can be obtained by decreasing the magnification of the finder contrary to the photographing optical system. Specifically, the decrease of the magnification of the finder causes the field of view thereof to become larger than that in the normal photographing mode, so that the macro-photographing range can be included in the finder field. It is possible to indicate the macro-photographing range from the larger finder field by a special means.

In a camera having a macro-photographing function in which the finder optical system is provided independently of the photographing optical system, the present invention is characterized by the provision of a variable power lens in the finder optical system which changes the magnification and a field-magnification-varying-mechanism which moves the variable power lens in a direction which decreases the magnification.

Preferably, a macro-photographing range indicating frame (macro frame) is provided to indicate a corresponding macro-photographing range from the field of view which is widened by the decrease of the magnification.

The present disclosure relates to subject matter contained in Japanese Pat. Application No.2-33002 (filed on Feb. 14, 1990) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

The illustrated embodiment is applied to a camera having a zoom photographing optical system, a finder optical system, and a macrophotographing function in which a lens assembly of the zoom photographing system can be advanced beyond the telephoto-extremity to take a picture at a macro mode.

Figure 2:
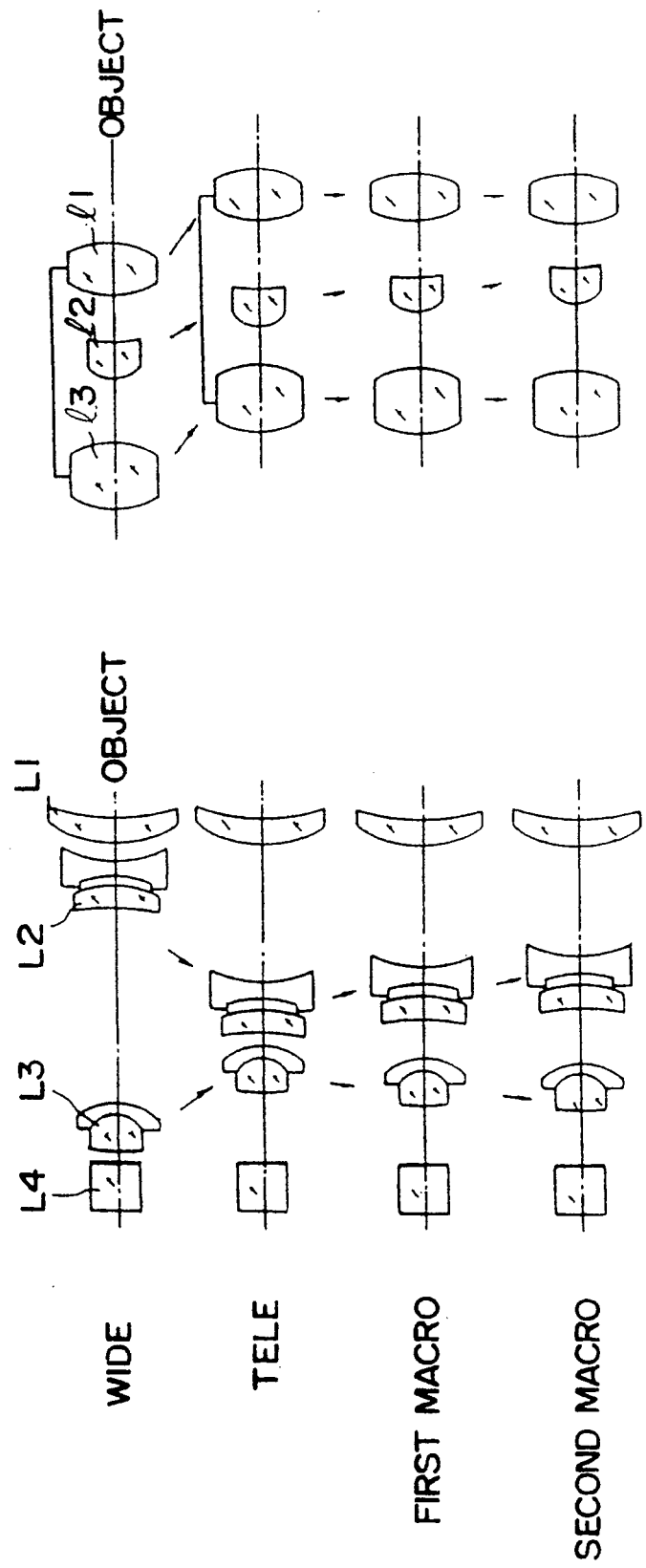
FIG. 2 is an arrangement of lenses of a finder optical system and a photographing optical system, and tracks of movement thereof.

FIG. 2 shows a lens arrangement of a finder optical system F and a track of the movement thereof, and a lens arrangement of a photographing optical system T and a track of the movement thereof. The photographing optical system T has first, second and third lens groups 1 1, 1 2 and 1 3. The first and third lens groups 1 1 and 1 3 move together and the second lens group 1 2 moves relative to the first and third lens groups 1 1 and 1 3 in a predetermined relationship to change the spatial distance therebetween, effecting a normal zooming operation between a telephoto-extremity and a wide-extremity. A forward movement of the second lens group 1 2 beyond the telephoto-extremity causes the photographing mode to come to a first macro range (first macro-extremity) in which the macro-Photographing can be effected. Due to further advancement of the second lens group 1 2, the latter is brought into a second macro range (second macro-extremity) in which a picture at a closer object distance can be taken. Namely, the magnification increases as the second lens group 1 2 moves from the telephoto-extremity to the first macro range and the second macro range. The focusing is effected by moving the second lens group 1 2 in the optical axis direction.

The finder optical system F has first through fourth lens groups L1~L4, of which the first and fourth lens groups L1 and L4 are immovable, and the second and third lens groups L2 and L3 are movable power-variable lenses. The second and third lens groups L2 and L3 are associated with the zooming operation of the photographing optical system T in the normal zoom range to change the finder field of view thereof. Upon transfer from the telephoto-extremity to the first macro-extremity, the second and third lens groups L2 and L3 are moved in a direction which decreases the finder magnification contrary to the photographing optical system T. When the photographing mode is transferred to the second macro-extremity, the second and third lens groups L2 and L3 are further moved in a direction which decreases the finder magnification.

Figure 1:
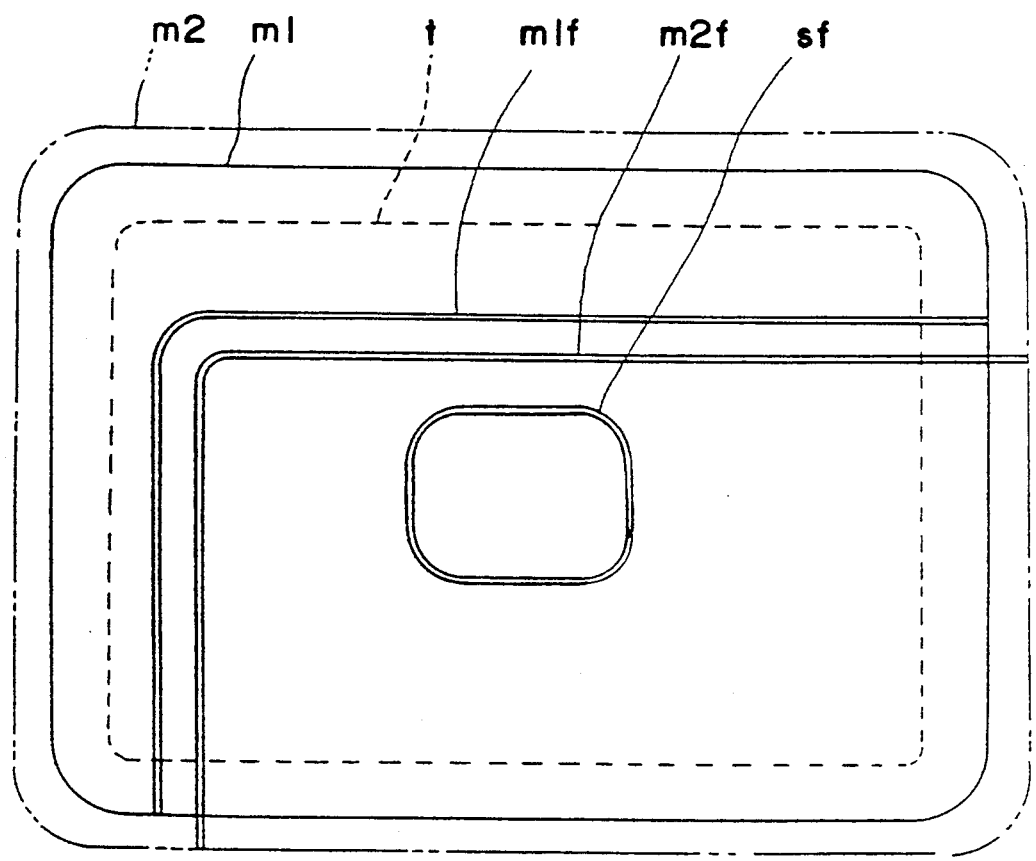
FIG. 1 is a front elevational view showing the change in the field of view of a finder, according to the present invention.

FIG. 1 shows the change in the field of view in the field frame at the telephoto-extremity, the first macro extremity and the second macro extremity. Note that in FIG. 1, the field of view through the finder varies, but no physical change in the size of the finder itself takes place. Supposing that the normal field t at the telephoto-extremity is represented by a dotted line in FIG. 1, and that the fields m1 and m2 at the first macro range (extremity) and the second macro range (extremity) are enlarged as shown by a solid line and a two-dotted and dashed line, respectively. The photographing range of the first and second macro-extremities can be included in the enlarged first and second macro fields m1 and m2. The first and second macro frames m1f and m2f are provided in the finder to identify the first and second macro-photographing range in the enlarged fields, respectively. The first and second macro frames m1f and m2f are usually formed to indicate the photographing ranges which are slightly narrower than the actual photographing plane. In FIG. 1, "sf" designates an object distance frame which represents an object distance measuring range of an auto focusing device.

As can be seen from the foregoing, according to the present invention, since the photographing range is indicated by decreasing the magnification of the finder optical system F upon transfer to the macro-photographing range, no deviation of the optical axis occurs, thus resulting in no deterioration of the image. Furthermore, it is possible to correct the diopter at the macro-photographing mode by having the photographer look at the portion located closer than a reference distance of the normal zooming mode by moving the second and third lens groups L2 and L3 (part of the finder optical system) in association with the magnification varying mechanism for varying the finder magnification (power).

Figure 3:
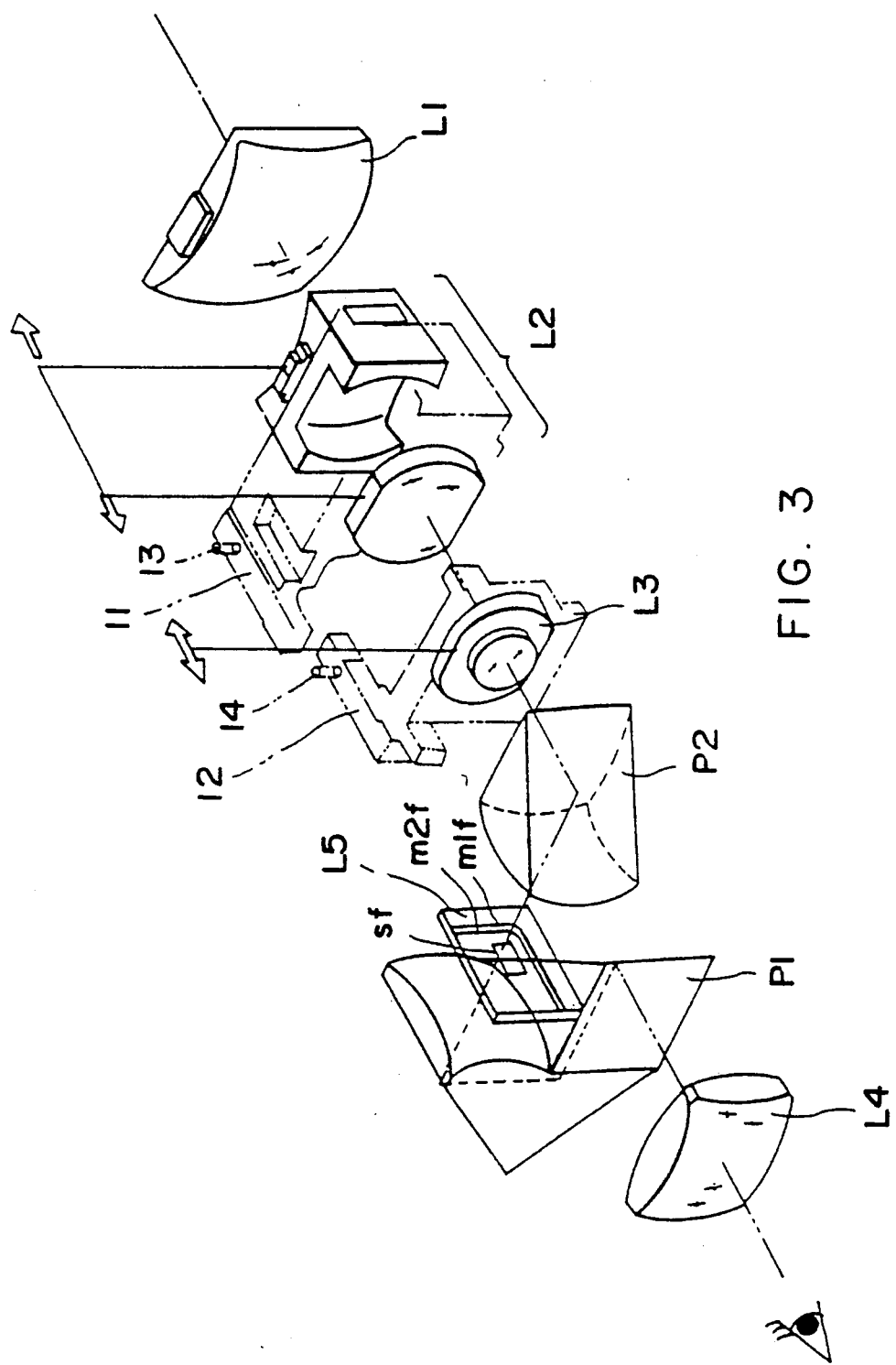
FIG. 3 is a perspective view of a finder optical system according to the present invention.
Figure 4:
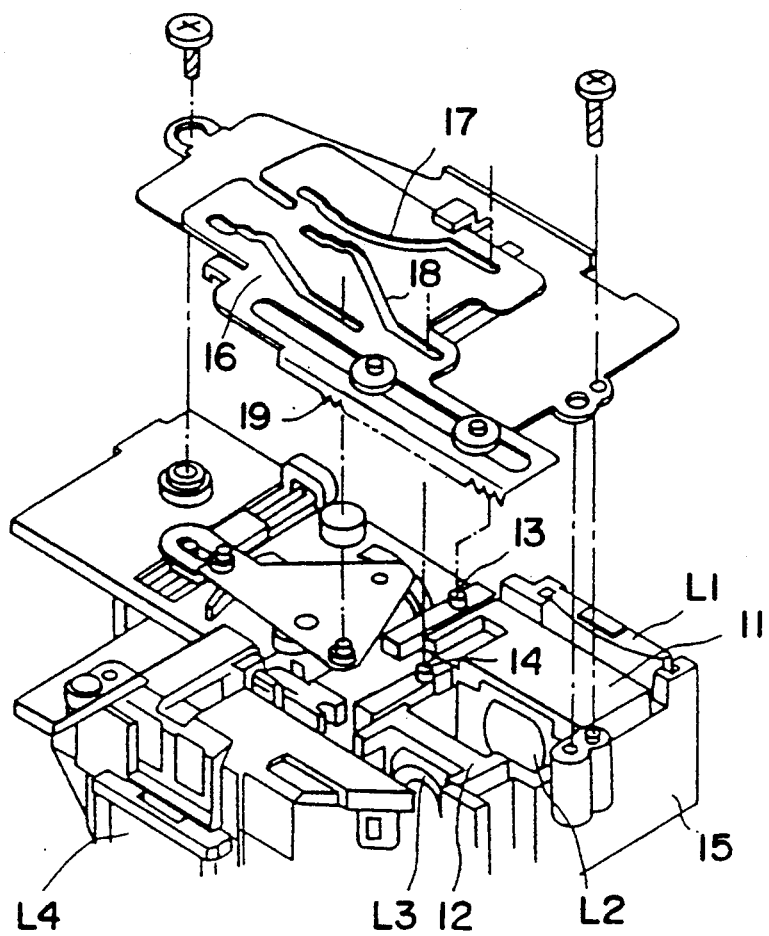
FIG. 4 is a perspective view of a finder device having therein the finder optical system shown in FIG. 3; and, FIG. 5 is a plan view of the cam plate shown in FIG. 4.
Figure 5:
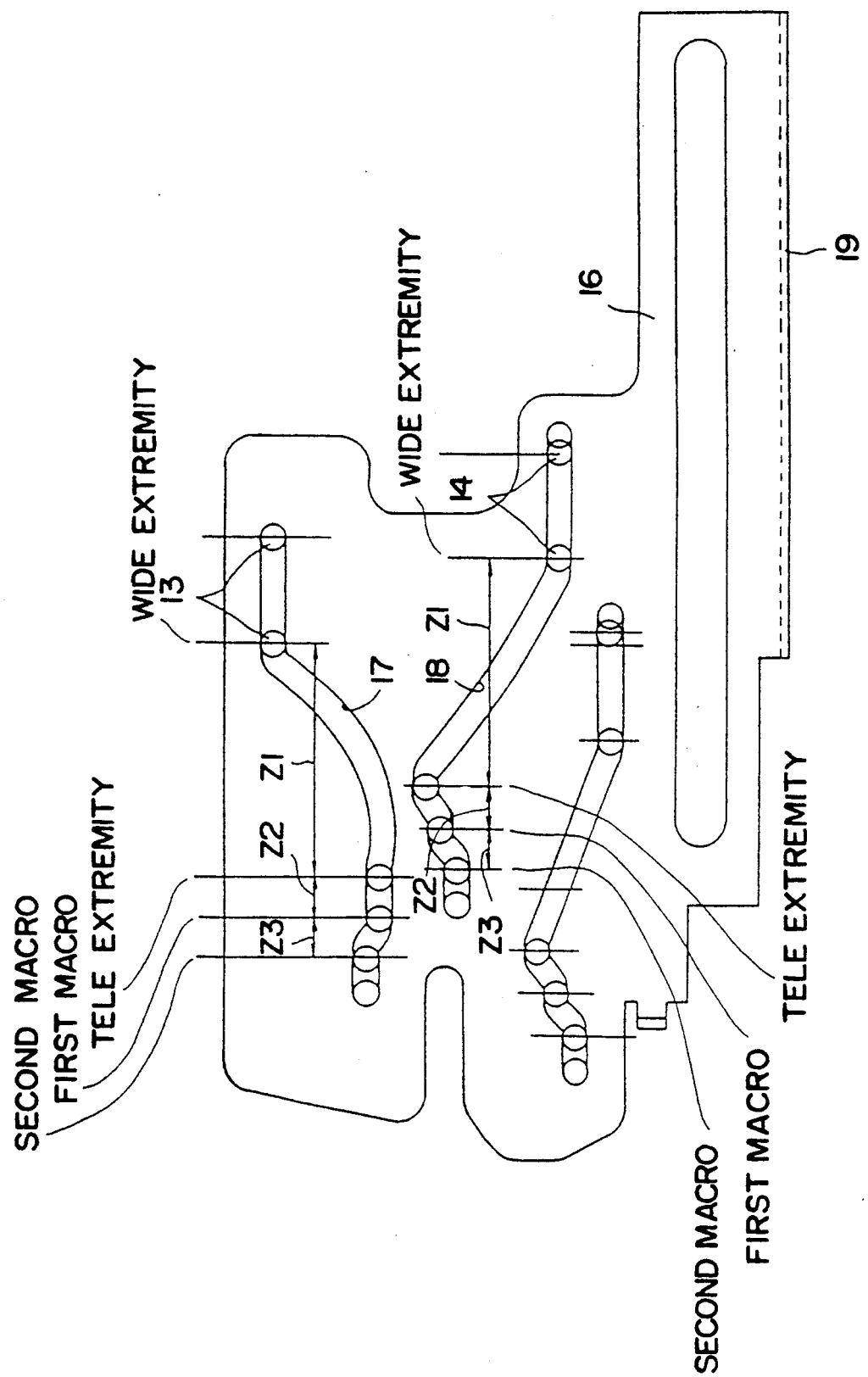

FIGS. 3 through 5 show an arrangement for moving the second and third lens groups L2 and L3 along respective predetermined tracks.

In FIG. 3, a composite lens prism P1 and a lens prism P2 are provided in addition to the finder optical system F shown in FIG. 2, to provide the necessary optical path length as a real image type finder. The second and third lens groups L2 and L3 are secured to respective movable frames 11 and 12, which are provided on their upper surfaces with driving pins 13 and 14, respectively. Between the composite lens prism P1 and the lens prism P2 are provided a field frame plate L5 on which are drawn the first macro frame m1f, the second macro frame m2f, and the object distance frame sf. An image of the objective optical system which is composed of the lens groups L1 through L3 and the lens prism P2 is formed on the field frame plate L5 and can be observed through an eye piece optical system which is composed of the composite lens prism P1 and the fourth lens group L4.

The movable frames 11 and 12 are movably supported in a finder unit 15 so as to move in the optical axis direction. On the finder unit 15 is supported a cam plate 16 so as to move in the lateral direction, which has cam grooves 17 and 18 in which the driving pins 13 and 14 can be fitted. The cam plate 16 is provided on its rear portion with a laterally extending rack 19 which can be engaged by a pinion (not shown). The pinion rotates in association with the zooming operation and the transfer to the macro mode of the zoom-photographing optical system to laterally move the cam plate 16.

The cam grooves 17 and 18 have the zoom section Z1, first macro-transfer section Z2 and second macro-transfer section Z3 for moving the movable frames 11 (second lens group L2) and 12 (third lens group L3), respectively, as shown in FIG. 5. The extremities of these sections; Z1, Z2 and Z3, define the wide-extremities, the telephotoextremities, the first macro-extremities and the second macro-extremities, respectively. Consequently, when the cam plate 16 is laterally moved, the second and third lens groups L2 and L3 are moved in accordance with the tracks, as shown in FIG. 2.

As can be understood from the above discussion, according to the present invention, since the field of view including the photographing range can be obtained by decreasing the magnification of the finder upon transfer to the macro-photographing mode, the macro-photographing range can be visibly confirmed easily without deteriorating an image, unlike in the prior art mentioned above in which the optical axis is made to deviate by the insertion of the lens prism into the optical path or the movement of the field frame itself. The provision of the macro-frame or macro-frames to indicate the macro-photographing range in the finder enables a photographer to know more precisely the macro-photographing range.

I claim:

1. A finder device for a camera having a photographing optical system and a finder optical system independent from the photographic optical system and having a macro-photographing mode, wherein said finder comprises:
   at least one variable power lens which is provided in said finder optical system to vary the magnification of the finder optical system; and,
   a field magnification varying device which moves said variable power lens in a direction to decrease the magnification upon transfer to said macro-photographing mode.

2. A finder according to claim 1, further comprising a macro-photographing range indicating frame which is provided in said finder optical system to indicate a macro-photographing range upon transfer to said macro-photographing mode.

3. A finder according to claim 2, wherein said macro-photographing mode comprises a plurality of macro-photographing modes in which said field magnification varying device provides different values of magnification of said finder optical system.

4. A finder according to claim 3, wherein said macro-photographing frame comprises a plurality of frames having different sizes corresponding to the different values of magnification.

5. A finder according to claim 3, wherein said magnification of said finder optical system decreases as the magnification of said photographing optical system increases.

6. A finder according to claim 1, wherein said finder optical system comprises a real image type finder device having an objective optical system and an eye piece optical system through which an image formed by said objective optical system can be observed.

7. A finder according to claim 6, further comprising a field frame plate on an image plane on which an image is formed by said objective optical system.

8. A finder according to claim 7, further comprising a macro-photographing range indicating frame which is provided on said field frame plate to indicate a macro-photographing range upon transfer to said macro-photographing mode.

9. A finder according to claim 8, wherein said objective optical system comprises a pair of variable power lenses which vary said magnification of said finder optical system.

10. A finder according to claim 1, wherein the variable power lens moves to correct a diopter of said finder optical system at said macro-photographing mode.

11. A finder according to claim 10, wherein said diopter is corrected at said macro-photographing mode so that a photographer looks at a portion located closer than a reference distance of a normal zooming mode.

12. A camera comprising:
a zoom-photographing optical system;
a zoom finder optical system which varies the field of view in accordance with a zoom-photographing range of said zoom-photographing optical system;
said zoom-photographing optical system having a macro-photographing mode at which a picture can be taken at a closer object distance than a normal zoom-photographing range; and,
a field magnification varying device which varies the magnification of said zoom finder optical system to a value smaller than that in the zoom-photographing range upon transfer of said zoom-photographing optical system to said macro-photographing mode.

13. A camera according to claim 12, further comprising a macro-photographing range indicating frame which is provided in said finder optical system to indicate a macro-photographing range upon transfer to said macro-photographing mode.

14. A camera according to claim 12, wherein said macro-photographing mode comprises a plurality of macro-photographing modes in which said field magnification varying device provides different values of magnification of said zoom finder optical system.

15. A camera according to claim 14, wherein said macro-photographing frame comprises a plurality of frames having different sizes corresponding to the magnifications.

16. A camera according to claim 12, wherein said magnification of said zoom finder optical system decreases as the magnification of said zoom photographing optical system increases.

17. A camera according to claim 12, wherein said zoom-photographing optical system moves from a focal length extremity on a telephoto side to said macro-photographing mode.

18. A camera according to claim 17, wherein said field magnification varying device of said zoom finder optical system varies the field magnification to a value smaller than that at the telephoto extremity thereof upon transfer of said zoom-photographing optical system to the macro-photographing mode.

19. A camera according to claim 12, wherein said zoom finder optical system includes a pair of variable power lenses which vary the magnification of the finder optical system.

20. A finder according to claim 19, wherein said pair of variable power lenses move to correct a diopter of said zoom finder optical system at said macro-photographing mode.

21. A camera according to claim 20, wherein said diopter is corrected at said macro-photographing mode so that a photographer looks at a portion located closer than a reference distance of a normal zooming mode.

* * * * *

UNITED STATES PATENT AND TRADEMARK OFFICE
CERTIFICATE OF CORRECTION

PATENT NO. : 5,081,480
DATED : January 14, 1992
INVENTOR(S) : Tetsuya ABE

It is certified that error appears in the above-indentified patent and that said Letters Patent is hereby corrected as shown below:

On the title page: Item [56], under U.S. PATENT DOCUMENTS, insert ---4,967,219 10/1990 Morisawa et al. 354/219---.
Item: [56], under U.S. PATENT DOCUMENTS, insert ---4,944,030 7/1990 Haraguchi et al. 354/222---.
Item: [56], under U.S. PATENT DOCUMENTS, insert ---4,000,501 12/1976 Sakaguchi et al. 354/199---.
Item [56], insert ---WO/8707038 11/1987 P.C.T.---.

Signed and Sealed this

Fifth Day of March, 1996

Attest:

BRUCE LEHMAN

*Attesting Officer*    *Commissioner of Patents and Trademarks*